(12) United States Patent
Leroy et al.

(10) Patent No.: US 12,366,193 B2
(45) Date of Patent: *Jul. 22, 2025

(54) SYSTEMS AND METHODS FOR MODELLING AFTERTREATMENT TEMPERATURE OF A VEHICLE

(71) Applicant: Ford Global Technologies, LLC, Dearborn, MI (US)

(72) Inventors: Tom Leroy, Dagenham (GB); Owen Lineham, Grays (GB); Mike Rowland, Wickham Bishops (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,381

(22) Filed: Oct. 10, 2023

(65) Prior Publication Data

US 2024/0117761 A1    Apr. 11, 2024

Related U.S. Application Data

(63) Continuation of application No. 17/577,666, filed on Jan. 18, 2022, now Pat. No. 11,815,002.

(51) Int. Cl.
*F01N 9/00*    (2006.01)
*F01N 3/20*    (2006.01)

(52) U.S. Cl.
CPC .............. *F01N 9/00* (2013.01); *F01N 3/2013* (2013.01); *F01N 2900/08* (2013.01); *F01N 2900/1402* (2013.01); *F01N 2900/1404* (2013.01); *F01N 2900/1406* (2013.01)

(58) Field of Classification Search
CPC ...... F01N 3/2013; F01N 3/2026; F01N 3/027; F01N 5/02; F01N 9/00; F01N 2240/16; F01N 2900/1402; F01N 2900/1404; F01N 2900/1406; F01N 2900/1631; F01N 2900/0602; F01N 2550/22; Y02T 10/12; Y02T 10/40

See application file for complete search history.

(56) References Cited

U.S. PATENT DOCUMENTS

| | | | |
|---|---|---|---|
| 5,444,978 A | 8/1995 | Yoshizaki et al. | |
| 8,244,421 B2 | 8/2012 | Aoki et al. | |
| 8,261,534 B2 * | 9/2012 | Sano | F01N 3/2013 60/287 |
| 11,066,976 B2 | 7/2021 | Kurtz et al. | |
| 11,092,050 B2 | 8/2021 | Matsumura | |
| 11,492,941 B1 * | 11/2022 | Hirooka | F01N 11/00 |
| 11,815,002 B2 * | 11/2023 | Leroy | F01N 3/021 |
| 2009/0113883 A1 | 5/2009 | Bhatia et al. | |
| 2010/0205939 A1 | 8/2010 | Sano et al. | |
| 2013/0338863 A1 | 12/2013 | Shallvari et al. | |
| 2016/0290308 A1 | 10/2016 | Szczepanski | |
| 2019/0277176 A1 * | 9/2019 | Nakayama | B60K 6/40 |

\* cited by examiner

*Primary Examiner* — Dapinder Singh
(74) *Attorney, Agent, or Firm* — Haley Guiliano LLP

(57) ABSTRACT

Methods and systems are provided for model-based determination of a temperature distribution of an exhaust aftertreatment system of a vehicle. A power demand from a first component of the aftertreatment system is measure, a heat transfer into the first component of the aftertreatment system based on power demand of the first component and a configurable emissivity value of the exhaust gas is determined, and the temperature of the first component based on the calculated heat transfer is calculated.

18 Claims, 12 Drawing Sheets

SYSTEMS AND METHODS FOR MODELLING AFTERTREATMENT TEMPERATURE OF A VEHICLE

CROSS REFERENCE TO RELATED APPLICATIONS

This application is a continuation of U.S. patent application Ser. No. 17/577,666, filed Jan. 18, 2022, the disclosure of which is hereby incorporated by reference herein in its entirety.

BACKGROUND

The present disclosure relates to systems and methods for model-based determination of a temperature distribution of an exhaust aftertreatment system of a vehicle, more particularly, but not exclusively, to systems and methods for determining the temperature of an electronic catalyst, eCAT, in an aftertreatment system with the use of heat transfer equations.

SUMMARY

Through consumer demand and local regulation, the need for reduced engine emissions has led to engine exhaust systems that comprise catalytic converters. Catalytic converters are a specific type of engine after-treatment system that reduces pollutants in exhaust gases by catalyzing a redox reaction. Catalytic converters are located downstream of the engine within a structure/housing in the exhaust system, that is designed to contain and direct exhaust gases over and/or through the catalytic converter. Like many after-treatment systems, catalytic converters require heating up to be most effective. As the demand for cleaner emissions increases and legislation requires a reduction in the pollutants produced by internal combustion engines, solutions involving exhaust after-treatment systems are increasingly desired.

To meet legislation emissions requirements (in jurisdictions such as the EU, the UK, or North America), internal combustion engine powertrains require electrically heated catalysts (eCATs) to assist catalyst light-off and to maintain optimal temperature for conversion. Current legislation proposals, for example in the EU7 emissions legislation, require 15 years or 240,000 km (whichever is achieved first) of vehicle life wherein emissions must be maintained. Typically, the current life expectancy of a vehicle is 10 years or 240,000 km. Therefore, extending the lifetime is expected to be critical to meet the current proposed legislation.

Due to the extended durability requirement, an area of concern is that over time the performance of the eCAT element and the after-treatment filters may degrade. The eCAT device is positioned in the exhaust system, upstream of the majority of the after-treatment components and filters. Therefore, it is exposed to contaminants such as soot and particulates from the engine. Over time the eCAT element may become contaminated, which could change the resistance of the device and therefore change its output power. An increase in eCAT device resistance could result in reduced power output. A decrease in resistance could result in an eCAT power output that is too great, which may damage or degrade the eCAT device over time. Moreover, contamination of the eCAT device could potentially decrease the thermal transfer from the eCAT element to the gas, impacting catalyst heating efficiency. These factors risk maintaining eCAT device capability and thus emissions.

Particulate filters capture and store exhaust soot to reduce emissions from vehicles. A particulate filter periodically has to be emptied of soot or the soot has to be burned off to regenerate the DPF. Typically, particulate filter regeneration will be initiated in response to a trigger event, such as a contamination level of the filter. Both the eCAT and the particulate filter may therefore require regeneration, in some examples, the regeneration of each of the eCAT and particulate filters needs to be carried out at the same time. The regeneration of the eCAT can be assisted by also initiating a particulate filter regeneration if the conditions are appropriate to do so, which will be described in more detail below.

According to examples in accordance with an aspect of the disclosure, there is provided a method for model-based determination of a temperature distribution of an exhaust aftertreatment system of a vehicle. The vehicle may be, for example, a mildly hybrid electric vehicle (mHEV), although other Hybrid and High voltage applications that deploy applicable after-treatment systems such as a fully hybrid electric vehicle (FHEV) or a partially hybrid electric vehicle (PHEV) platforms are also suitable. The method comprises measuring a power demand from a first component of the aftertreatment system. In some examples, the first component is an electrically heated catalyst. The method further comprises calculating a heat transfer into the first component of the aftertreatment system based on the power demand of the first component and a configurable emissivity value of the exhaust gas and calculating the temperature of the first component based on the calculated heat transfer.

In some examples, the method further comprises estimating a volumetric flow rate of exhaust gas through the aftertreatment system. In some examples, the calculation of the heat transfer into a first component of the aftertreatment system is based on the volumetric flow rate of the exhaust gas.

In some examples, the method further comprises configuring the emissivity value of the exhaust gas based on at least one of: air-mass ratio; air-fuel ratio; fuel type; temperature; pressure; or emissions output.

In some examples, the method further comprises determining if an internal combustion engine, ICE, of the vehicle is off. In response to determining that the ICE is off, configuring the emissivity value of the exhaust gas based on an emissivity value of air corrected for pressure and temperature of the aftertreatment system.

In some examples, the method further comprises determining if an internal combustion engine, ICE, of the vehicle is on and a secondary airflow is on. In response to determining that the ICE and secondary airflow is on, configuring the emissivity value of the exhaust gas based on air-mass ratio, air-fuel ratio, corrected for pressure and temperature of the aftertreatment system.

In some examples, the method further comprises determining if an internal combustion engine, ICE, of the vehicle is on and a secondary airflow is off. In response to determining that the ICE and secondary airflow is off, configuring the emissivity value of the exhaust gas based on air-fuel ratio, corrected for pressure and temperature of the aftertreatment system.

In some examples, the first component of the aftertreatment system is an electrically heated catalyst, eCAT. In some examples, the method further comprises determining if the eCAT is on or off. In response to determining the eCAT is on, selecting a first radiation heat transfer equation.

In some examples, the method further comprises, in response to determining the eCAT is off, selecting a convection heat transfer equation, a second radiation heat transfer equation, or a combination of the convection heat transfer equation and second radiation heat transfer equations.

In some examples, the method further comprises monitoring an ambient temperature of the vehicle, and the calculation of the heat transfer is further based on the ambient temperature of the vehicle.

In some examples, the aftertreatment system is divided into segments in an axial direction and the first component is located in a first segment. In some examples, the method further comprises calculating the temperature of a second segment, disposed upstream of the first segment, wherein the calculation of the heat transfer is further based on an input heat from the second segment. In some examples, calculating the temperature of a third segment, disposed downstream of the first segment, wherein the calculation of the heat transfer is further based on an output heat to the third segment.

According to a second example in accordance with an aspect of the disclosure, there is provided an after-treatment system of a vehicle comprising an electrically heated catalyst, eCAT, electrically coupled to a power source, and a controller, communicatively coupled to the eCAT and the power source. The controller is configured to measure a power demand of the eCAT from the power source, calculate a heat transfer into the eCAT of the aftertreatment system based on the power demand of the eCAT and a configurable emissivity value of the exhaust gas, and calculate the temperature of the eCAT based on the calculated heat transfer.

In some examples, the controller is further configured to estimate a volumetric flow rate of exhaust gas through the aftertreatment system; and wherein the calculation of the heat transfer into the eCAT of the aftertreatment system is based on the volumetric flow rate of the exhaust gas.

In some examples, the controller is adapted to configure the emissivity value of the exhaust gas based on at least one of: air-mass ratio; air-fuel ratio; fuel type; temperature; pressure; or emissions output.

In some examples, the controller is further configured to determine if an internal combustion engine, ICE, of the vehicle is off. In response to determining that the ICE is off, configure the emissivity value of the exhaust gas based on an emissivity value of air corrected for pressure and temperature of the aftertreatment system.

In some examples, the controller is further configured to determine if an internal combustion engine, ICE, of the vehicle is on and a secondary air pump is on. In response to determining that the ICE and secondary air pump is on, the controller configures the emissivity value of the exhaust gas based on exhaust-air ratio or air-fuel ratio, corrected for pressure and temperature of the aftertreatment system.

In some examples, the controller is further configured to determine if an internal combustion engine, ICE, of the vehicle is on and a secondary air pump is off. In response to determining that the ICE and secondary air pump is off, the controller configures the emissivity value of the exhaust gas based on air-fuel ratio, corrected for pressure and temperature of the aftertreatment system.

In some examples, the controller is further configured to determine if the eCAT is on or off. In response to determining the eCAT is on, select a first radiation heat transfer equation.

In some examples, the controller is further configured to, in response to determining the eCAT is off, select a convection heat transfer equation, a second radiation heat transfer equation, or a combination of the convection heat transfer equation and second radiation heat transfer equations.

In some examples, the controller is further configured to monitor an ambient temperature of the vehicle. In some examples, the calculation of the heat transfer is further based on the ambient temperature of the vehicle.

In some examples, the aftertreatment system is divided into segments in an axial direction and the eCAT is located in a first segment. In some examples, the controller is further configured to calculate the temperature of a second segment, disposed upstream of the first segment, wherein the calculation of the heat transfer is further based on an input heat from the second segment, and calculate the temperature of a third segment, disposed downstream of the first segment. In some examples, the calculation of the heat transfer is further based on an output heat to the third segment.

According to a third example in accordance with an aspect of the disclosure, there is provided a vehicle. The vehicle comprises an after-treatment system an electrically heated catalyst, eCAT, electrically coupled to a power source, and a controller, communicatively coupled to the eCAT and the power source. In some examples, the controller is configured to carry any one or more examples as described herein. For example, the controller may be configured to measure a power demand of the eCAT from the power source, calculate a heat transfer into the eCAT of the aftertreatment system based on the power demand of the eCAT and a configurable emissivity value of the exhaust gas, and calculate the temperature of the eCAT based on the calculated heat transfer.

According to a fourth example in accordance with an aspect of the disclosure, there is provided a non-transitory computer-readable medium having instructions encoded thereon for model-based determination of a temperature distribution of an exhaust aftertreatment system of a vehicle which, when executed, carry out the method of any of the examples described herein. For example, the method may comprise measuring a power demand from a first component of the aftertreatment system, calculating a heat transfer into the first component of the aftertreatment system based on power demand of the first component and a configurable emissivity value of the exhaust gas, and calculating the temperature of the first component based on the calculated heat transfer.

For the avoidance of doubt, the system and methods for regenerating an after-treatment system of a vehicle, according to any of the examples described herein, may be used to better calculate the temperature of the eCAT and other components of an aftertreatment system. In addition, novel enable and disable conditions for the eCAT are provided based on the new modeling of the eCAT temperatures and catalyst brick temperature. Various heat transfer calculations that are used in the modeling are provided. Whilst the benefits of the systems and method may be described by reference to hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize catalytic converters and would benefit from a more accurate calculation of the aftertreatment system temperature, such as electrical generators, mining equipment, stoves, and gas heaters.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which.

DETAILED DESCRIPTION

Figure 1:
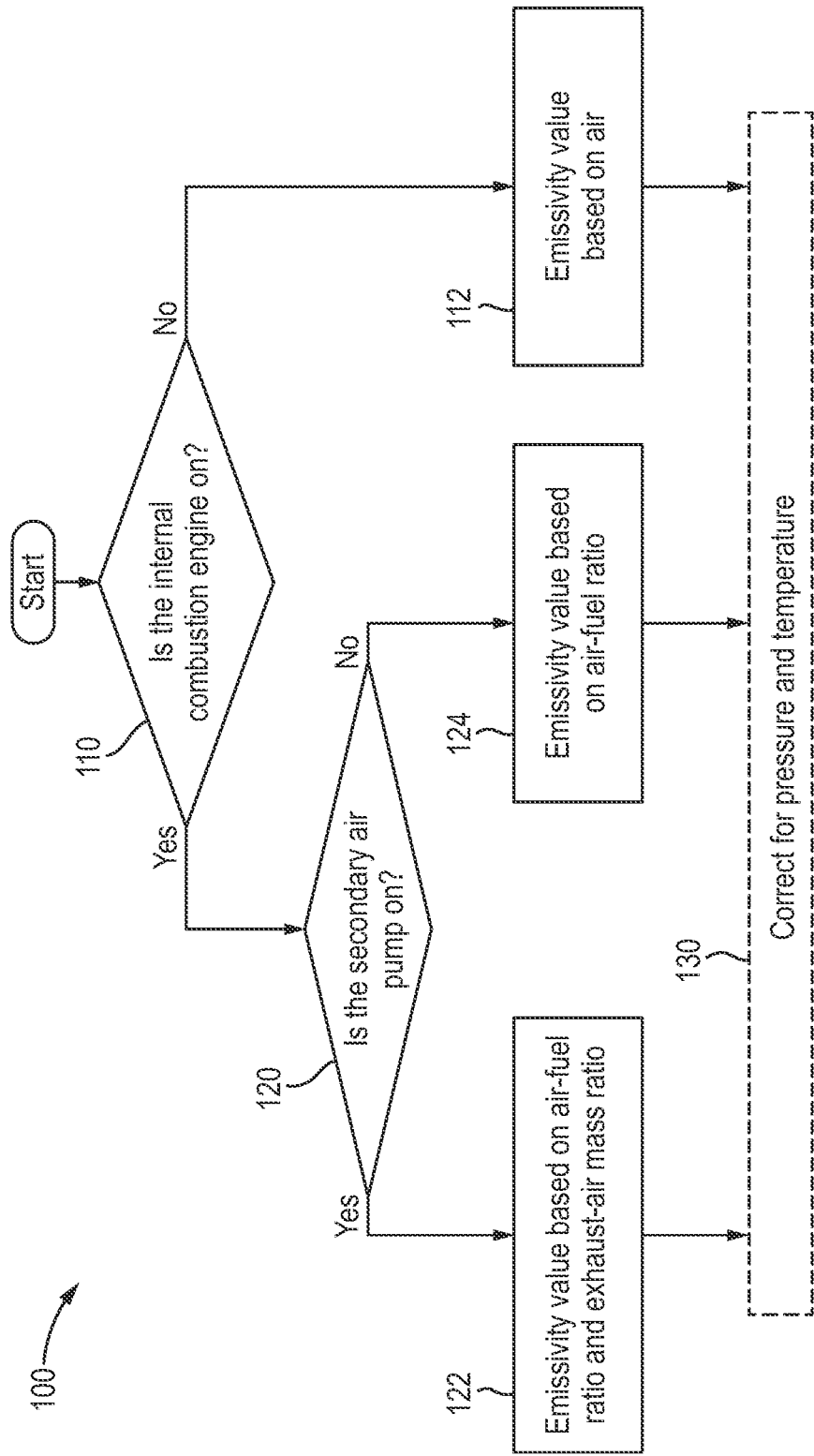
FIG. 1 illustrates an example flow chart of a method for model-based determination of a temperature distribution of an exhaust aftertreatment system of a vehicle, in accordance with at least one of the examples described herein.

It should be understood that the detailed description and specific examples herein while indicating exemplary embodiments, are intended for purposes of illustration only and are not intended to limit the scope of the disclosure. These and other features, aspects, and advantages of the present disclosure will become better understood from the following description, appended claims, and accompanying drawings. It should be understood that the figures are merely schematic and are not drawn to scale. It should also be understood that the same or similar reference numerals are used throughout the Figures to indicate the same or similar parts.

As discussed briefly above, current regulations on emissions standards are requiring manufacturers of internal combustion engines to reduce the operating emissions from the engines they manufacture. These engines are used in any appropriate type of vehicle, such as an automobile, a motorbike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed, torque, or acceleration and therefore switching from one type of motor to another yields greater efficiencies than either one could have their own. However, under the proposed new emissions standards in markets such as, for example, the European Union (EU), North America, China, and the United Kingdom (UK), the increased efficiencies of hybrid vehicles may be insufficient to satisfy new emissions standards.

One solution to treat the toxic emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, catalytic converters, and particular filters. An exemplary exhaust after-treatment system is introduced with reference to FIG. 2 and described in detail with reference to FIG. 7.

Electrically heated catalysts, or eCATs, are a type of catalytic converter, which have been in use for a number of years. An eCAT typically comprises a heating element disposed within, or near to, a catalyst. eCATs are required in various use cases and will demand a power supply between 0-4 kW (0 to 4000 Watts) for example, depending on the use case. For example, the heating elements within the eCATs will have a thermal output of 0-4 kW (0 to 4000 Watts). An eCAT typically has low inductance and therefore the power output (or thermal power output) can be changed rapidly. The eCAT produces thermal power to warm the catalyst but consumes electrically current to produce the thermal power. The eCAT demand is supported by a hybrid powertrain electrical system in an HEV or PHEV platform. For example, in a cold start use case, the eCAT may demand its full rated power (e.g., ~4 kW) to maintain after-treatment temperature.

In particular, the systems and methods described herein are adapted to, at a high level, model the temperature of components of an aftertreatment system. For clarity, this is irrespective of the method used to control the eCAT, i.e. via a DCDC controller or PWM driver. Accordingly, with regard to the below disclosures, the DCDC controlled eCAT is assumed as part of the system for various reasons which are not necessarily related to this proposed solution. However, a DCDC converter controlled eCAT device enables an additional advantage that can be utilized as a part of the below solutions. For example, modulating the voltage and/or current into the eCAT element.

FIG. 1 illustrates an example flow chart of a method for model-based determination of a temperature distribution of an exhaust aftertreatment system of a vehicle, in accordance with at least one of the examples described herein. In some examples, the order of the steps in FIG. 1 is for illustrative purposes and process 100 may be repeated multiple times and re-executed at any time. Process 100 shown in FIG. 1 starts at step 110. At step 110, it is determined whether or not the internal combustion engine of the vehicle is on.

If the response to step 110 is no, process 100 continues on to step 112. At step 112, the emissivity value for the exhaust gas is selected to be based on air.

If the response to step 110 is yes, process 100 continues on to step 120. At step 122, it is determined whether the secondary air pump is on or not. If the answer to step 120 is yes, process 100 continues on to step 122.

At step 122, the emissivity value for the exhaust gas is selected to be based on air-fuel ration and an exhaust-air mass ratio.

If the response to step 120 is no, process 100 continues on to step 124. At step 124, the emissivity value for the exhaust gas is selected to be based on an air-fuel ratio.

After steps 112, 122, and 124, process 100 optionally continues on to step 130. At step 130, the selected emissivity values for a selected heat transfer equation is corrected for pressure and temperature of the aftertreatment system. In particular, in some examples, an average temperature or pressure across the entire aftertreatment system may be used. In some examples, the correction for pressure and temperature is based on the modeled temperature around the catalyst assembly 230, as described with reference to FIG. 2, below.

In some examples, the emissivity values can be further based on the composition of the exhaust gases. For example, the exhaust gases of a diesel-based internal combustion engine typically comprise 67& nitrogen, 12% carbon dioxide, 11% water vapor and 10% oxygen, ~0.15% nitrogen oxides, ~0.045% carbon monoxide, and similar amounts of particulate matter, hydrocarbons and sulfur dioxide. It should be noted however that these are exemplary percentages from a diesel engine in idle on a test rig, and will vary greatly when the engine is under load. Moreover, the temperature and pressure of the aftertreatment system will further affect the contribution of each of the components of the exhaust gases. Therefore, in some examples, the emissivity value chosen is based on the composition of the exhaust gases and the temperature and pressure of the aftertreatment system. In some examples, the operator (e.g., the driver) of the vehicle or a manufacturer may add an additive to the fuel or internal combustion engine to change the composition of the exhaust gases, therefore, the emissivity value can be adapted to take account of this. In some examples, the aftertreatment system of the vehicle comprises at least one emission sensor to detect the composition of the exhaust gases.

Figure 2:
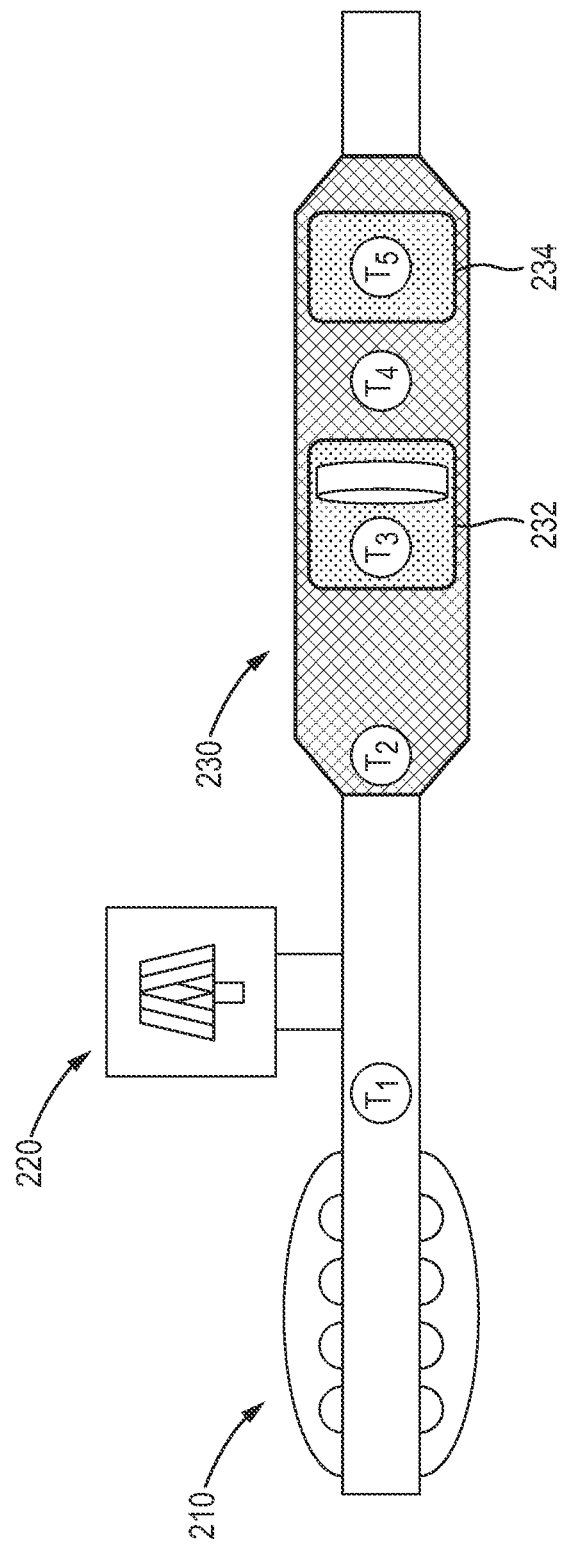
FIG. 2 illustrates a block diagram of an exemplary catalyst assembly and components of an exhaust system, in accordance with at least one of the examples described herein.

FIG. 2 illustrates a block diagram of an exemplary catalyst assembly and components of an exhaust system, in accordance with at least one of the examples described herein. FIG. 2 depicts an engine 210, secondary air pump 220, and a catalyst assembly 230 comprising an electronically heated catalyst, eCAT, 232, and catalyst brick 234. As shown in FIG. 2, there are numerous temperature points $T_1$-$T_5$, which are referred to through the description. $T_1$ is the exhaust gas temperature at the exhaust manifold of engine 210. In some examples, the temperature point $T_1$ may be post a turbocharger or any other after engine component, however, $T_1$ is before the secondary air pump 220. $T_2$ is the exhaust gas temperature at the inlet cone of the catalyst assembly 230, after the secondary air pump. $T_3$ is the exhaust gas temperature at the eCAT 232. $T_4$ is the exhaust temperature in front of the catalyst brick 234. In some examples, the eCAT 232 may abut the catalyst brick 234, therefore temperature point $T_4$ will be omitted and $T_5$ will be used in its place. $T_5$ is the temperature of the catalyst brick 234.

In some examples, temperature point $T_1$ is based on a measured temperature or a model of the exhaust temperature at the engine based on a measured engine temperature.

In some examples, temperature point $T_2$ is calculated based on the modeled or measured temperature at $T_1$ and the thermal energy loss/input between the engine 210 and the catalyst assembly 230, $T_{loss1}$, and the thermal energy loss/input due to the secondary air pump 220, $T_{air}$. In particular a heat transfer equation is utilized to model the temperature at $T_2$. In some examples, the heat transfer between position $T_2$ and $T_1$ is a convection heat transfer and is therefore determined by the following formula:

$$Q = m \cdot c \cdot \Delta T \quad (1)$$

Wherein Q is the thermal energy, m is the air mass, c is the specific heat capacity, and $\Delta T$ is the temperature difference. In particular, the heat transfers occur between the exhaust gas into the pipe wall, which is a function of exhaust gas-mass and $T_1$, pipe surface area and a heat coefficient, $\alpha$. In addition, there is a heat trans from the pipe wall to the ambient environment, which is a function of ambient temperature and airflow around the pipe, represented by the coefficient, $\gamma$.

Applying formula (1) to point $T_2$:

$$Q_2 = Q_1 - Q_{ExhtoWall} \quad (2)$$

$$Q_{wall} = Q_{ExhtoWall} - Q_{WalltoAmb} \quad (3)$$

$$m_{pipe} \cdot c_{pipe} \cdot (\Delta T_{Wall}) = (\alpha \cdot A \cdot (T_1 - T_{wall})) - (\gamma \cdot (T_{wall} - T_{amb})) \quad (4)$$

Equation (4) allows for the calculation of T2 and pipe wall temperature and it is also application for the heat change transfer between T3 and T5. The temperature change caused by secondary air from the secondary air pump 220 on the exhaust temperature can be calculated using the ratio of exhaust gas-mass and secondary air mass:

$$T_{SecAir} = \frac{(T_1 \cdot m_1) + (T_2 \cdot m_2)}{m_1 + m_2} \quad (5)$$

The 'position' of the calculation of the secondary air impact reflects the hardware location.

In some examples, temperature point $T_3$ is calculated based on the temperature point $T_2$ and the thermal energy loss/input from the eCAT 232. In some examples, when the eCAT is off, the eCAT device acts as a heat sink. $T_3$ is the exhaust gas temperature located at the exit of the eCAT. One assumption that is made is that the eCAT radiates and distributes heat evenly across its surface. In some examples, the model can be improved by characterizing the distribution across the eCAT. The eCAT transfer heat by radiation and is therefore determined by the heat transfer equation:

$$\frac{Q_{net}}{t} = \sigma \cdot \varepsilon \cdot A \left(T_3^4 - T_2^4\right) \quad (6)$$

Where; $Q_{net}$ is the net heat transfer rate by radiation (e.g., absorption minus emission), $\sigma$ is the Stefan-Boltzmann constant, $\varepsilon$ is the emissivity of an object. The emissivity of the object, in the present disclosure is configurable based on the composition of the exhaust gas. For example, when the engine is off, and the secondary air pump 220 is on, the emissivity chosen will be that of air, which is 0.8. Other emissivity values include water, 0.95; carbon dioxide, which can range from 0.003 to 0.2; Nitrous oxide, Sulphur oxides and other engine emissions. In addition, the emissivity is also dependent on the pressure and temperature of the exhaust gas in the aftertreatment system. The range of carbon dioxide values, for example, ranges based on the pressure and temperature. The emissivity values can be stored in local storage, such as storage 1012 of FIG. 10.

The calculation of $$\frac{Q_{net}}{r}$$

in joules per second (J/s) or Watts (W). The eCAT is a device that typically consumes 2-6 kW power. This allows a calculation of the gas temperature $T_3$:

$$U_{eCAT} \cdot I_{eCAT} = \sigma \cdot \varepsilon \cdot A \cdot (T_3^4 - T_2^4) \tag{7}$$

$$\sqrt[4]{\frac{U_{eCAT} \cdot I_{eCAT}}{\sigma \cdot \varepsilon \cdot A} + T_2^4} = T_3 \tag{8}$$

This equation is used when the eCAT is active. When the eCAT is off, the aftertreatment system through to point $T_3$ can be treated as a straight pipe and just a convection heat transfer equation can be chosen.

In some examples, temperature point $T_4$ is calculated based on the temperature point $T_3$ and the thermal energy loss/input between the eCAT 232 and the catalyst brick 234, $T_{loss2}$. In addition, there is an additional exotherm factor as the thermal energy in the catalyst brick is stored within the catalyst brick and radiates back into the aftertreatment system. Therefore, the heat transfer in a catalyst is defined by the following:

$$Q_{eCAT} = Q_{ExhtoeCAT} + Q_{Exo} - Q_{eCATToAmb} \tag{9}$$

$$m_{eCAT} \cdot c_{eCAT} \cdot (\Delta T_5) = m_{exh} \cdot c_{exh} \cdot (T_4 - T_{eCAT}) + m_{exh} \cdot c_{exh} \cdot EXO_{eCAT} - (\gamma(T_5 - T_{amb}) \tag{10}$$

Figure 10:
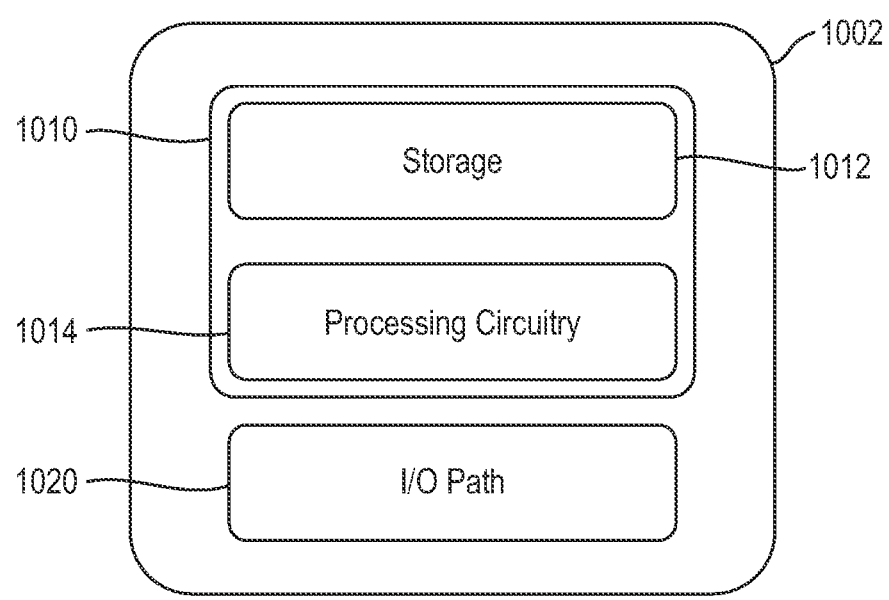
FIG. 10 illustrates a block diagram of a computing module, in accordance with some embodiments of the disclosure.

In some examples, the specific heat capacities of the eCAT and exhaust can be predetermined experimentally and stored in storage such as storage 1012 of FIG. 10. In some examples, temperature point $T_5$ is calculated based on the temperature point $T_4$ and the transient input from the catalyst assembly; and, in some examples, the temperature difference between the ambient temperature after the catalyst brick 234.

In some examples, the data that is predetermined and stored in storage such as storage 1012 of FIG. 10, can be updated remotely and therefore the model improved over time as more data becomes available. In some examples, vehicle operational parameters may also be taken into account to further improve the accuracy of the model. For example, the vehicle speed will have an impact on the thermal energy loss at $T_{loss1}$ and $T_{loss2}$ due to the air cooling effect on the underside of the moving vehicle. In another example, throughout the aftertreatment system, the current exhaust gas is determined to select an emissivity value, as described with reference to FIG. 1.

In the example shown in FIG. 2, there is an assumption that the catalyst assembly is connected to the engine by a "straight" pipe. However, in practice, the model for a particular aftertreatment system for any particular vehicle platform will be calibrated or predetermined.

Figure 3:
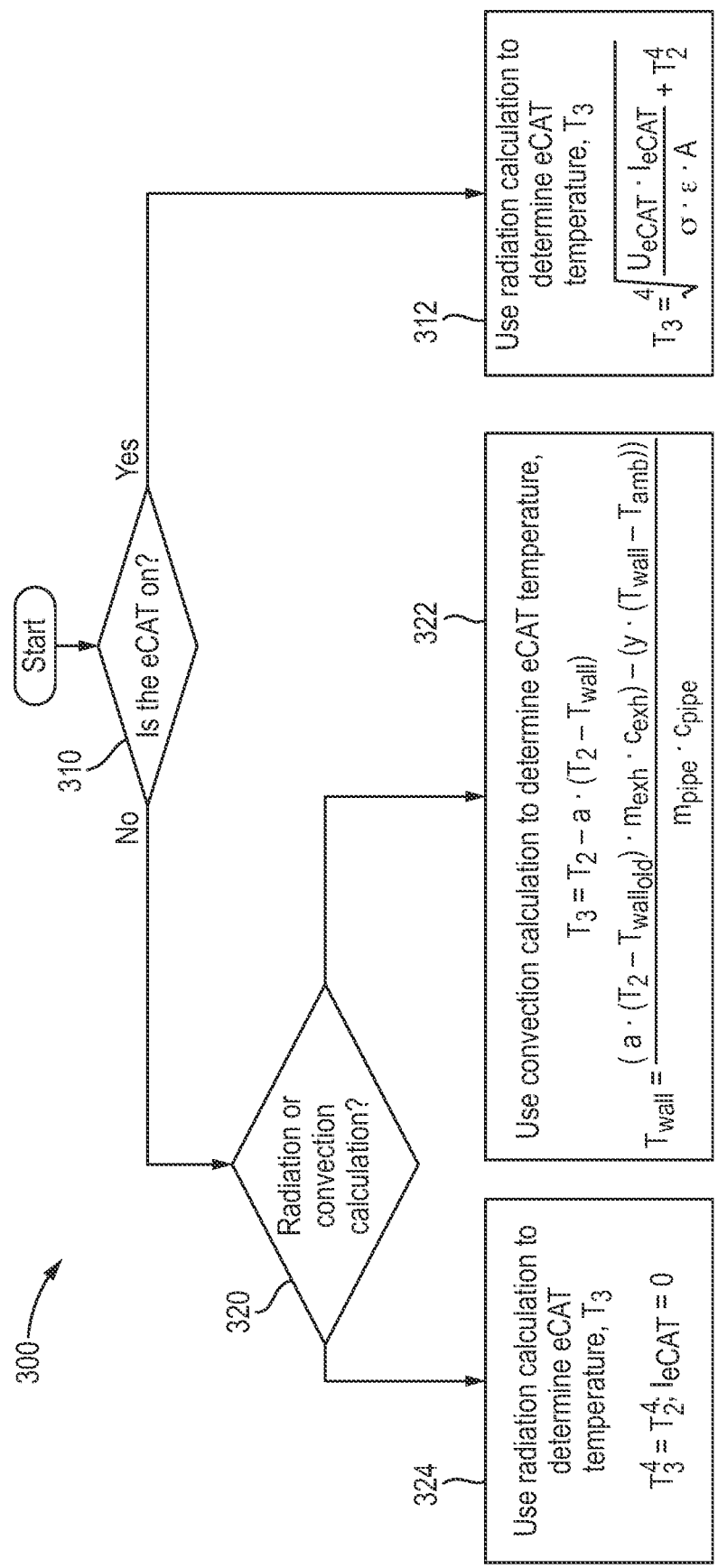
FIG. 3 illustrates an example flow chart of the decisions involved in choosing a heat equation for model-based determination of a temperature distribution of an exhaust aftertreatment system, in accordance with at least one of the examples described herein.

FIG. 3 illustrates an example flow chart of the decisions involved in choosing a heat equation for model-based determination of a temperature distribution of an exhaust aftertreatment system, in accordance with at least one of the examples described herein. In some examples, the order of the steps in FIG. 3 is for illustrative purposes and process 300 may be repeated at any step. Process 300 starts at step 310. At step 310, it is determined whether or not the eCAT is on. If the answer to step 310 is yes, process 300 continues to step 312.

At step 312, the radiation calculation is used to determine the eCAT temperature, $T_3$:

$$T_3 = \sqrt[4]{\frac{U_{eCAT} \cdot I_{eCAT}}{\sigma \cdot \varepsilon \cdot A} + T_2^4} \tag{11}$$

If the answer to step 310 is no, process 300 continues to step 320. At step 320, it is determined whether a radiation or convection heat transfer calculation is appropriate for calculating the eCAT temperature. In some examples, a combination of both the radiation and convection heat transfer equations are used. At step 322, the convection calculation is used to determine the eCAT temperature, $T_3$:

$$T_3 = T_2 - \alpha \cdot (T_2 - T_{wall}) \tag{12}$$

$$T_{wall} = \frac{(\alpha \cdot (T_2 - T_{wall_{old}}) \cdot m_{exh} \cdot c_{exh}) - (\gamma \cdot (T_{wall} - T_{amb}))}{m_{pipe} \cdot c_{pipe}} \tag{13}$$

At step 324, in some examples, if compute resources are low, the radiation calculation is preferred. Due to no current through the eCAT, the radiation calculation to determine the eCAT temperature, $T_3$:

$$T_3^4 = T_2^4; I_{eCAT} = 0 \tag{14}$$

Figure 4:
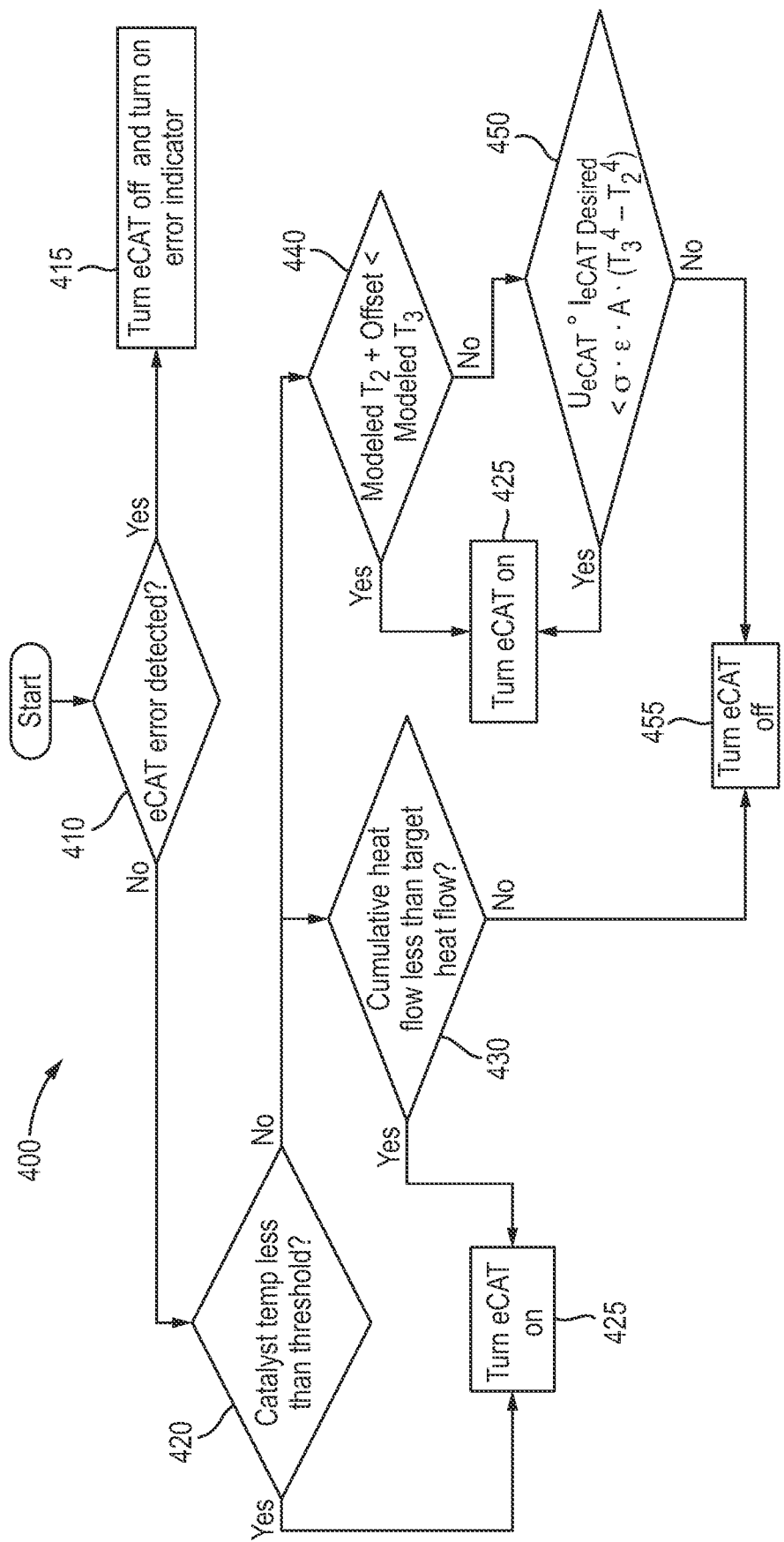
FIG. 4 illustrates an example flow chart of decisions involved in selecting the enable conditions of an electronically heated catalyst, in accordance with at least one of the examples described herein.

FIG. 4 illustrates an example flow chart of decisions involved in selecting the enable conditions of an electronically heated catalyst, in accordance with at least one of the examples described herein. In some examples, the order of the steps in FIG. 4 is for illustrative purposes, for example, step 430 and 440 may be carried out in parallel or any order.

Process 400 seeks to set out the enable conditions which can be more accurately controlled due to the new model of the temperature of the catalyst temperature at temperature points $T_1$-$T_5$. Process 400 begins at step 410. At step 410 it is determined whether or not an eCAT error has been detected. If the answer to step 410 is yes, process 400 continues to step 415.

At step 415, the eCAT is turned off and an error indicator is turned on. For example, if an eCAT is detected and the eCAT is determined to be on, the eCAT is turned off, and an indicator lamp is turned on to alert the operator of a vehicle to the error. In some examples, the eCAT may already be off (e.g., due to the fault itself), therefore the error indicator is turned on without the need to turn off the eCAT.

If the answer to step 410 is no, process 400 continues to step 420. At step 420, it is determined whether the catalyst temperature is less than a threshold. For example, the catalyst temperature at temperature point $T_5$, as referred to in FIG. 2, is at or above a threshold temperature. In some examples, a threshold temperature of the catalyst is a configurable target temperature wherein the catalyst brick is at an optimum operating temperature.

If the answer to step 420 is no, process 400 continues to steps 430 and 440, which may be carried out sequentially or in parallel. If the answer to step 420 is yes, process 400 continues to step 425, in which the eCAT is turned on. As shown in FIG. 4, in response to an affirmative answer for steps 420, 430, 440, or 450, process 400 continues to step 425 and the eCAT is turned on.

At step 430, it is determined if the cumulative heat flow is less than a target heat flow. For example, the cumulative heat flow required for catalyst light-off is a more appropriate consideration than the temperature of the eCAT, however, the cumulative heat flow through the aftertreatment system has been difficult to determine, until the present disclosure. If the modeled cumulative heat flow, from the engine, eCAT, secondary air, ambient temperatures, and an estimated exothermic reaction in the catalyst brick, etc., are higher than the heat flow needed for catalyst light off, then there is no need to further activate the eCAT. This would be "overkill" as the catalyst light-off energy is present in the system. In some examples, if the modeled cumulative heat flow is close to the target heat flow, the eCAT can be activated for a short period of time (e.g., at high or low power to assist in adding more thermal energy into the aftertreatment system. In addition, the cumulative heat flow model can be updated in response to driver actions, such as driving speed, driving style, a GPS route or indicator. If the answer to step 430 is no, process 400 continues to step 455, wherein the eCAT is turned off.

At step 440, it is determined if the temperature at temperature point $T_2$ of FIG. 2 above, plus an offset is less than the modeled temperature point $T_3$ or not. For example, if the exhaust gas temperature entering the eCAT at temperature point $T_2$ is higher than the temperature generated by the eCAT at temperature point $T_3$, there is no need to keep powering the eCAT. If the answer to step 440 is no, process 400 continues to step 450 wherein it is determined if the eCAT power, represented by $U_{eCAT} \cdot I_{eCAT\ Desired}$ or the current output power of the eCAT device is less than the radiation heat equation coefficients, represented by $\sigma \cdot \varepsilon \cdot A \cdot (T_3^4 - T_2^4)$. For example, if the eCAT temperature at temperature point $T_3$ is well below the exhaust temperature $T_2$, the eCAT should be turned on as work will be done on heating the eCAT rather than the catalyst brick. The present models can account for this interaction. Accordingly, a balance needs to be struck between electrical energy needed for the eCAT vs. the energy lost by heating the eCAT with the exhaust gas from the engine. Put another way, if $U_{eCAT} \cdot I_{eCAT\ Desired} = \sigma \cdot \varepsilon \cdot A \cdot (T_3^4 - T_2^4)$ then the eCAT should be turned on. If the answer to step 450 is no, process 450 continues to step 455, wherein the eCAT is turned off.

In some examples, the desired or requested current, power, or energy is used. In some examples, using the actual eCAT current would not work since at step 450, the eCAT is off and eCAT current is 0 A, therefore the eCAT would immediately turn on if T3−T2>0. The logic tries to compare how much energy, current, or power is needed or desired by turning the eCAT on, to overcome the temperature delta (i.e., temperature difference) between T3 and T2. For example, if the temperature difference between T3−T2 is less than 10° C., the eCAT would not be turned on as this would be a waste of battery energy to overcome a small delta temperature and the catalyst temperature (T5) is still be hot enough due to the exotherm effect of the catalyst. Thus, the thermal energy is the system is sufficient. On the other hand, continuing the same example, at a temperature difference of 50° C., between T2 and T3 the eCAT should be turned on, to prevent the catalyst temperature (T5) dropping to too low a value.

In another example, the temperature delta between T3−T2 is so large that turning on the eCAT would draw too much energy from the battery that would not be efficiently used. Therefore, in some examples, it is preferable to wait for the catalyst temperature to drop below a threshold and then activate the eCAT (such as what is shown in step 420 of FIG. 4). It is always possible the driver does a hard acceleration which causes the exhaust temperature to increase very quickly.

It should be borne in mind that above, and in other examples, reference is made to figures that comprise, the (desired) current of the eCAT, however, the (desired) eCAT energy or eCAT power desired. In some examples, the desired values are determined by experiment and are stored locally. In some examples, the desired values are updated remotely, updates may include more accurate or more precise data.

Figure 5A:
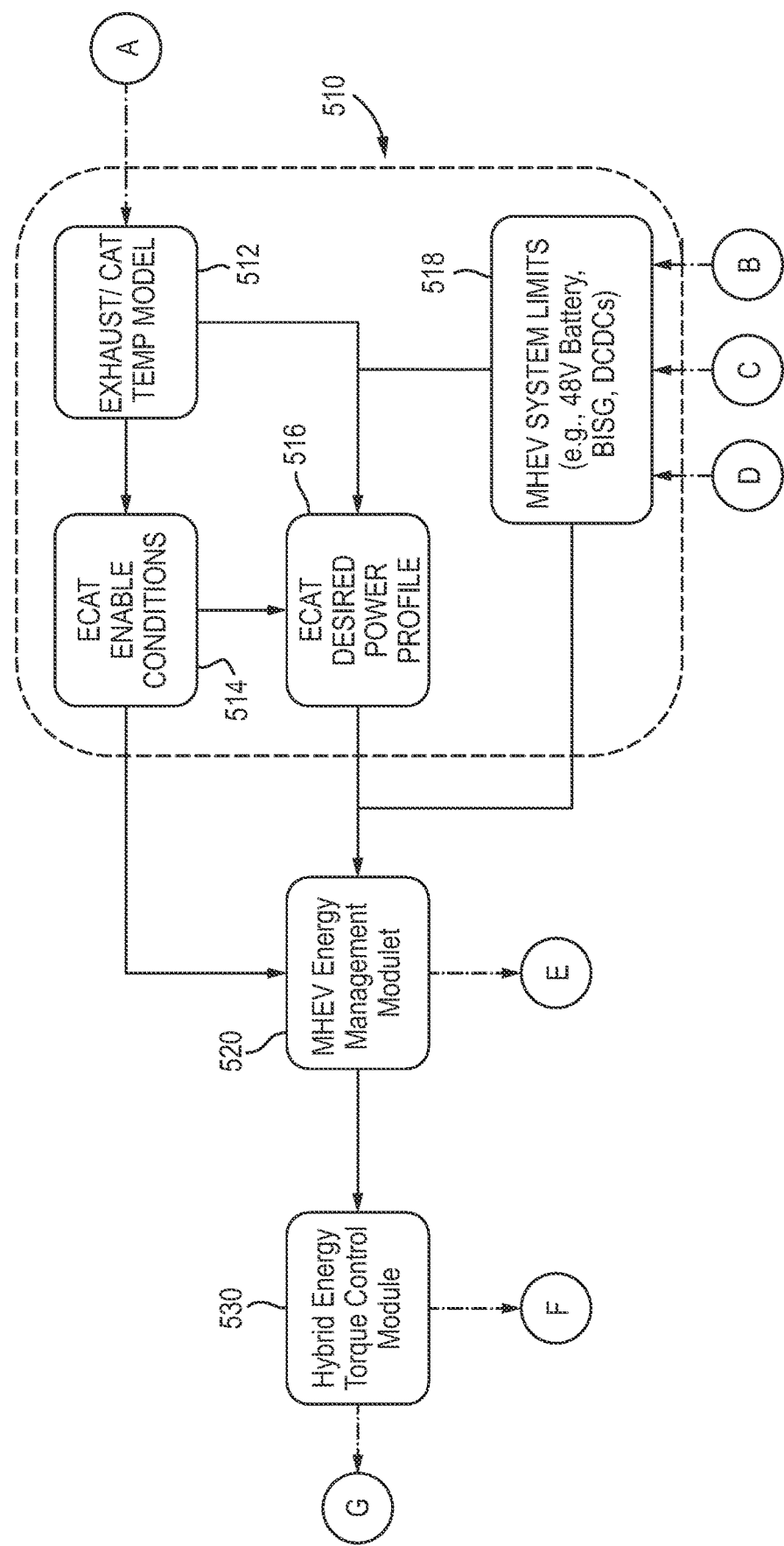
FIGS. 5A and 5B illustrate block diagrams of exemplary data and modules in an aftertreatment system, in accordance with at least one of the examples described herein.
Figure 5B:
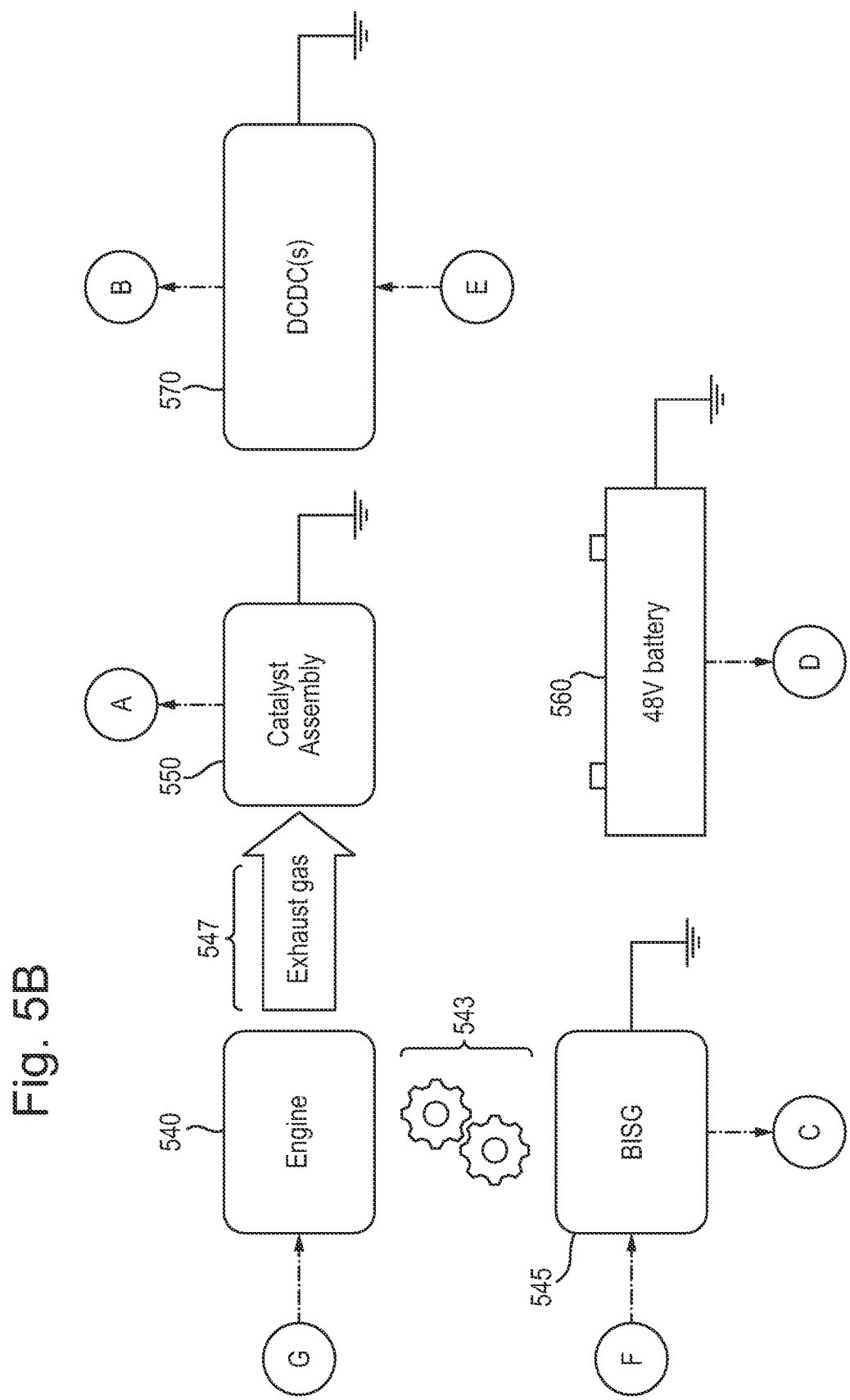

FIGS. 5A and 5B illustrate block diagrams of exemplary data and modules in an aftertreatment system, in accordance with at least one of the examples described herein. As shown in FIG. 5A there is a plurality of software data 510, which may be stored in a storage such as storage 1012 of FIG. 10. The software data 510 comprises the aftertreatment system (exhaust) and catalyst temperature model 512, which provides data to the eCAT enable conditions data 514 and the eCAT desire power profile module 516. The eCAT enable conditions data 514 is also provided to the eCAT desired power profile 516 and the MHEV energy management module 520. The software data 510 also comprises the MHEV system limits data 518, which is also provided to the eCAT desired power profile 516 and the MEHV energy management module 520. The exhaust/catalyst temperature model 512 receives an input from A, which will be described with reference to FIG. 5B, below. The MHEV system limits data 518 receives an input from B, C, and D, which will also be described with reference to FIG. 5B, below. In some examples, the software data 510 may be either stored locally on a computing device of the vehicle or stored on an external database.

FIG. 5A also shows modules, the MHEV energy management module 520, mentioned above, and the Hybrid Energy Torque Control module 530, which is communicatively coupled to the MHEV energy management module 520. The MHEV energy management module 520 and the Hybrid Energy Torque Control module 530 output to E, F, and G, as shown on FIG. 5A. In some examples, modules 520 and 530 are software-based modules, that may be stored locally on a computing device of the vehicle.

Referring to FIG. 5B, there is provided with a block diagram of the hardware components of the present disclosure. By contrast, collectively, the modules and data shown in FIG. 5A may be referred to as the software components of the present disclosure. FIG. 5B depicts a representation of an engine 540, mechanically coupled via a coupling 543 to a belt integrated starter generator, BISG, 545. The exhaust gas 547 from engine 540 is fluidly connected and provided to the catalyst assembly 550.

Power is provided to the catalyst assembly 550 by the hybrid (e.g., 48V) battery unit 560. The power provided is regulated by at least one DCDC converter 570. In some examples, the one or more DCDCs 570, may be replaced with an eCAT driver, such as a pulse-width modulation driver (not shown). The BISG 545, catalyst assembly 550, 48V battery 560, one or more DCDCs 570 and a 12V battery (not shown) are electrically coupled in a typical hybrid vehicle, which is shown and described in more detail below, with reference to FIGS. 7-9.

Catalyst assembly 550 outputs data A, which is received by the exhaust/catalyst temperature model 512. For example, data A may comprise exhaust gas composition, air-mass ratio, air-fuel ratio, fuel type, temperature, pressure, or emissions output. DCDC 570 outputs data B, BISG 545 outputs data C, and 48V battery outputs data D, which is received by MHEV system limits 518, as shown on FIG. 5A. For example, data B, data C, and data D may comprise eCAT power demand, eCAT current demand, battery voltage, BISG output, and DCDC information. Instructions E, F, and G are received by the DCDC 570, BISG 545, and Engine 540, respectfully, as shown on FIG. 5B.

Figure 6A:
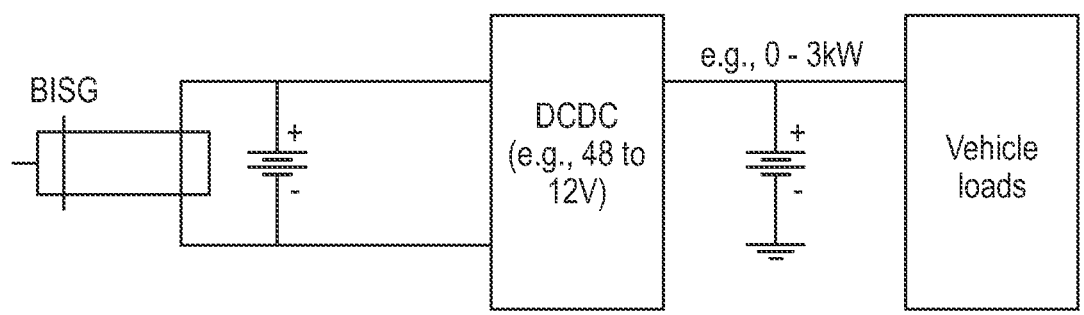
FIGS. 6A-6E illustrate the exemplary architecture of a vehicle aftertreatment system, in accordance with at least one of the examples described herein.

FIGS. 6A-6E illustrate the exemplary architecture of a vehicle aftertreatment system, in accordance with at least one of the examples described herein. In particular, FIG. 6A shows an electronic circuit diagram of how a DCDC converter is connected to the vehicle loads and 12V supply. While the examples and embodiments of the present disclosure do not necessarily require modifications to the architecture of the vehicle electronics, in some examples, the system can be further optimised with some changes. FIG. 6A is representative of a typical vehicle schematic of a mildly hybrid electric vehicle (mHEV).

Figure 6B:
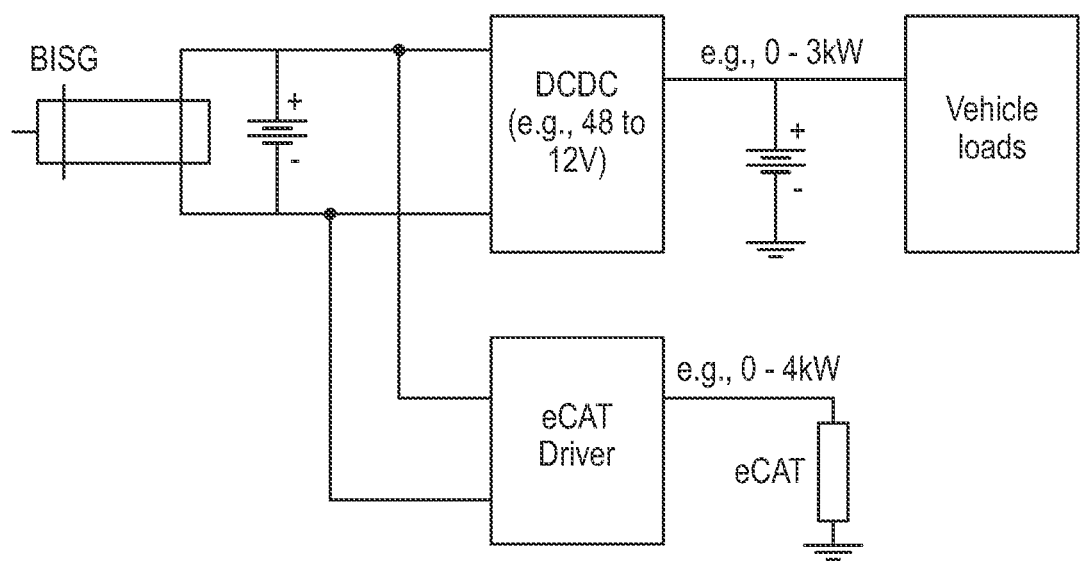

FIG. 6B illustrates, in addition to the components shown in FIG. 6A, an eCAT driver in parallel to the DCDC converter. In some examples, the eCAT driver is a pulse width modulation (PWM) driver, which is electronically coupled to the eCAT. The architecture is shown in FIG. 6B is an exemplary schematic of the architecture that may be required to meet new legislation standards, such as the EU7. In particular, an eCAT driver module, eCAT power provided only by the 48V bus voltage, wherein battery charge acceptance/discharge limits are critical to the standard and a BISG is required to make the desired step changes in torque.

Figure 6C:
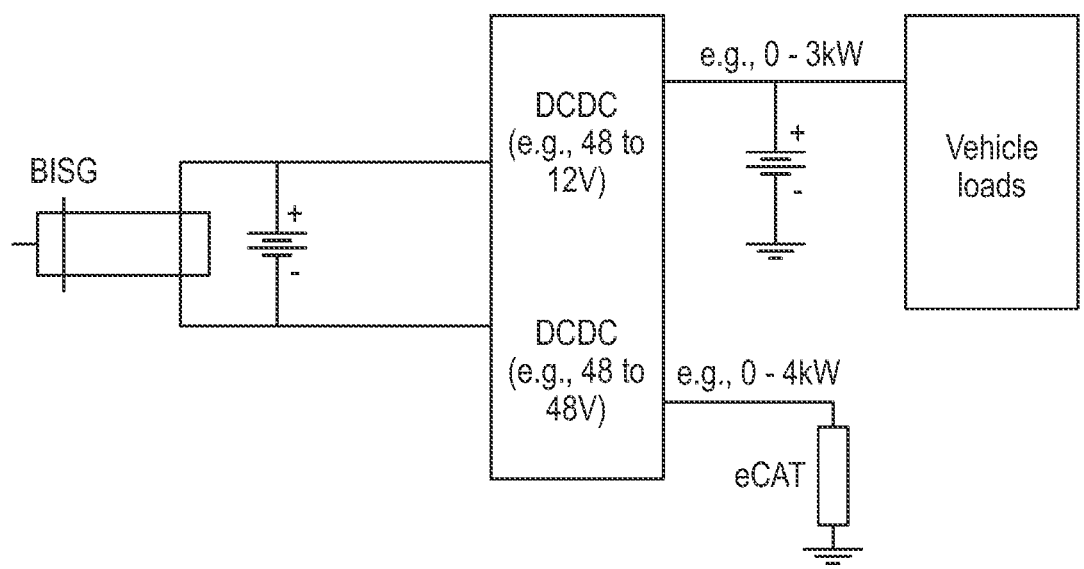

FIG. 6C illustrates, in addition to the components shown in FIG. 6A, two DCDC converters. In some examples, the first DCDC is a 48 to 12V converter and the second DCDC is a 48 to 48V converter. In some examples, the second DCDC unit has a separate cooling unit. In some examples, the two DCDCs are a single DCDC with a twin channel output. The second DCDC is electronically coupled to the eCAT to provide power (e.g., 0-4 kW). The architecture shown in FIG. 6C is an exemplary schematic of the architecture that may be required to meet new legislation standards, such as the EU7. In particular, a twin channel DCDC, continuous power control for the eCAT, wherein battery charge acceptance/discharge limits are not critical to the standard and a BISG can follow eCAT load slowly.

Figure 6D:
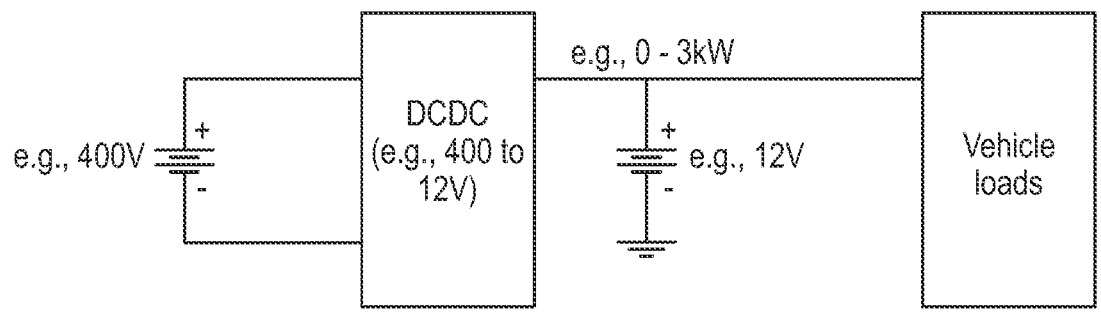

FIG. 6D is representative of a typical vehicle schematic of a partially hybrid electric vehicle (PHEV). FIG. 6D shows a first battery connected to a high voltage DCDC converter (e.g., 400 to 12V) connected to the vehicle loads and 12V supply.

Figure 6E:
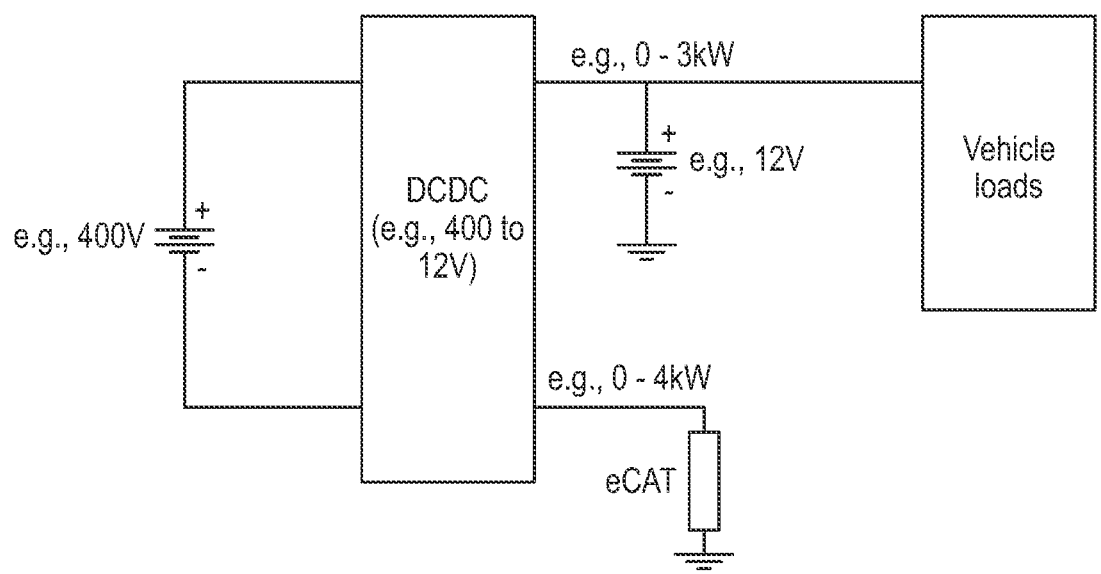

FIG. 6E illustrates, in addition to the components shown in FIG. 6E, an eCAT connected to the DCDC converter, which provides power to the eCAT (e.g., 0-4 kW). The architecture shown in FIG. 6E is an exemplary schematic of the architecture that may be required to meet new legislation standards, such as the EU7. In particular, a twin channel DCDC, continuous power control for the eCAT, wherein battery charge acceptance/discharge limits are not critical to the standard and a BISG can follow eCAT load slowly.

Figure 7:
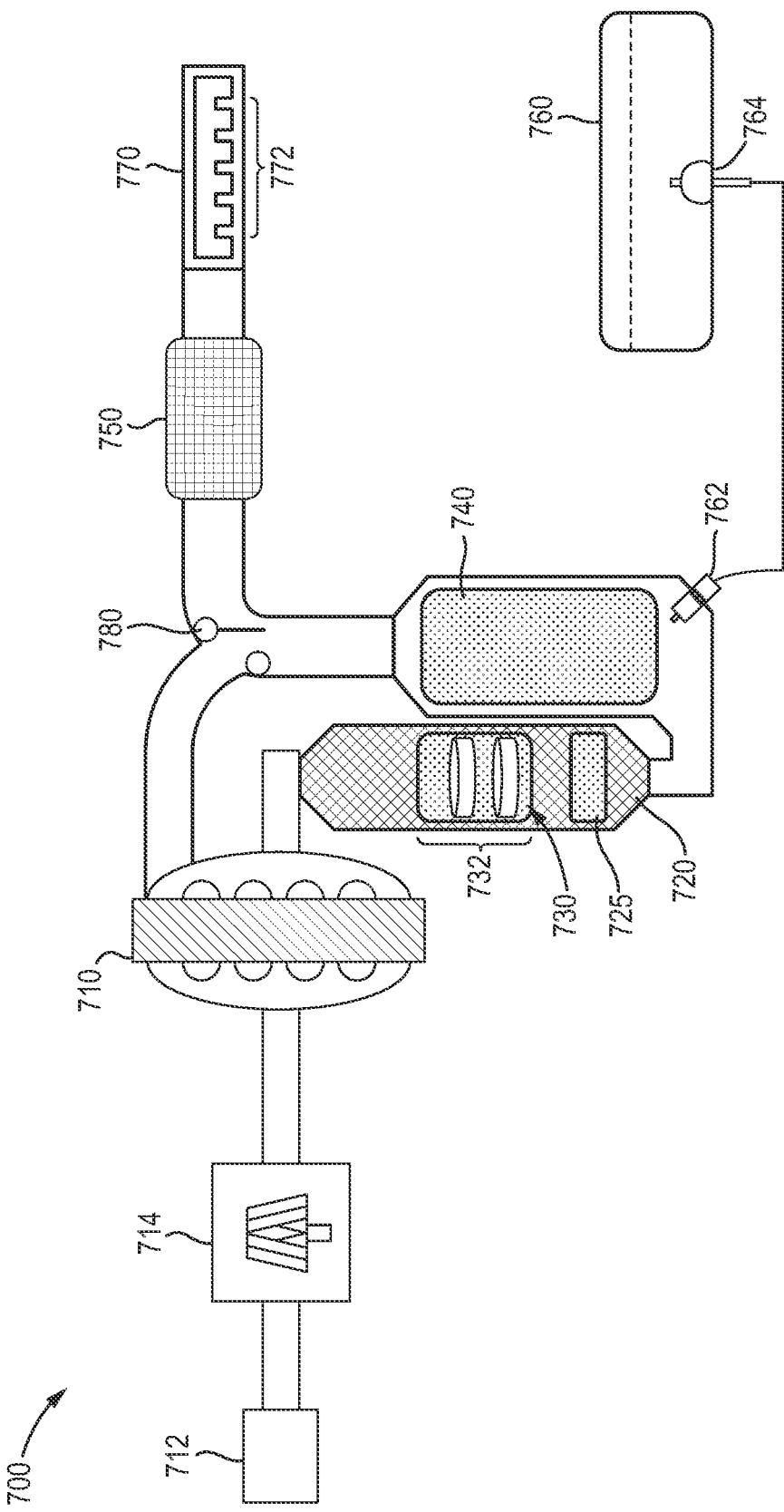
FIG. 7 illustrates an exemplary exhaust system comprising an after-treatment system, in accordance with at least one of the examples described herein.

FIG. 7 illustrates an exemplary exhaust system 700 comprising an engine 710 and an after-treatment system, comprising an eCAT 720. In some examples, the eCAT 720 comprises a catalyst 725 that is provided heat by the methods as described herein. In some examples, and as shown in FIG. 7, there is provided with an air-box 712 connected to a compressor 714 to draw air from the atmosphere. The airbox 712 and compressor 714 are fluidly connected to engine 710 and the after-treatment system to transfer thermal energy from a plurality of heating elements 732 disposed within the heating module 730 within the after-treatment system to the rest of the after-treatment system (e.g., to the catalyst 725). In some examples, to support local emissions regulations, additional systems such as an e-compressor 714 may be required. In particular, during a low flow exhaust gas situation, additional fans or the like to increase oxygen through the after-treatment system to assist in soot burn off may be required.

In some examples, there is a diesel particulate filter 740 downstream of engine 710. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the DPF).

In some examples, wherein the vehicle's internal combustion engine is fueled by gasoline, there is a gasoline particulate filter (GPF), which would replace the DPF as described above, downstream of engine 710. Similar to a DPF, a GPF is a filter that captures and stores exhaust soot, coke, and/or char, collectively referred to as particulate matter. The GPF is another form of after-treatment utilized to reduce emissions from gasoline vehicles. GPFs have a finite capacity, the trapped particulate matter periodically has to be emptied or 'burned off' to regenerate the GPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the GPF).

Particulate filters capture and store exhaust soot in order to reduce emissions from vehicles. A particulate filter periodically has to be emptied of soot or the soot has to be burned off to regenerate the DPF. There are nominally two types of regeneration processes; passive regeneration and active regeneration. Passive regeneration occurs when a vehicle is running at speed on long journeys, for example, motorway journeys, which causes an increase in the exhaust temperature to a level high enough to cleanly burn off the excess soot in the filter. Active regeneration is a process wherein additional thermal energy is input into the exhaust gas system. If, for example, the particulate filter and the eCAT are regenerated separately, the eCAT may be exposed to more high power output events that would be necessary, given some monitoring of operational parameters and regeneration event management between eCAT and particulate filter. In some examples, active regeneration is initiated in response to a trigger event, such as a contamination level of the filter or expiry of a time limit.

In some examples, there is also provided with a selective catalytic reduction (SCR) 750 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide (CO2), which is then expelled through the vehicle tailpipe 770. The DEF may be stored in a DEF tank 760. The DEF may be distributed through several pumps and valves 762 and 764, as shown in FIG. 7. The number of pumps and valves 762 and 764 are for illustration purposes and additional pumps and valves 762 and 764 may be located throughout the exhaust and/or after-treatment system. The location of the pumps and valves 762 and 764 are similarly for illustration purposes and the location of the pumps and valves 762 and 764 can be different from that shown in FIG. 7.

In some examples, the exhaust system comprises several sensors 772 to detect the flue gas containing oxides of nitrogen (NOx) and oxides of sulfur (SOx), to ensure the final emissions are within a regulation amount. Euro 5 exhaust emission legislation and Euro 6 exhaust emission legislation, have effectively made it mandatory for DPFs, DEF, and SCRs to meet the emissions standards. However, future emission legislation, such as Euro 7, such technology alone may not be sufficient. The systems and embodiments described herein may replace, or work in conjunction with DPFs, DEF, and SCRs and meet the future standards.

In some examples, the exhaust system comprises an exhaust gas recovery system, which is enabled by an EGR switch 780. The EGR switch 780 enables some or all exhaust gas, or the thermal energy of the exhaust gas, to be recirculated through the exhaust system to further compound the heating effect of the heating elements 732 within the heating module 730.

Figure 8:
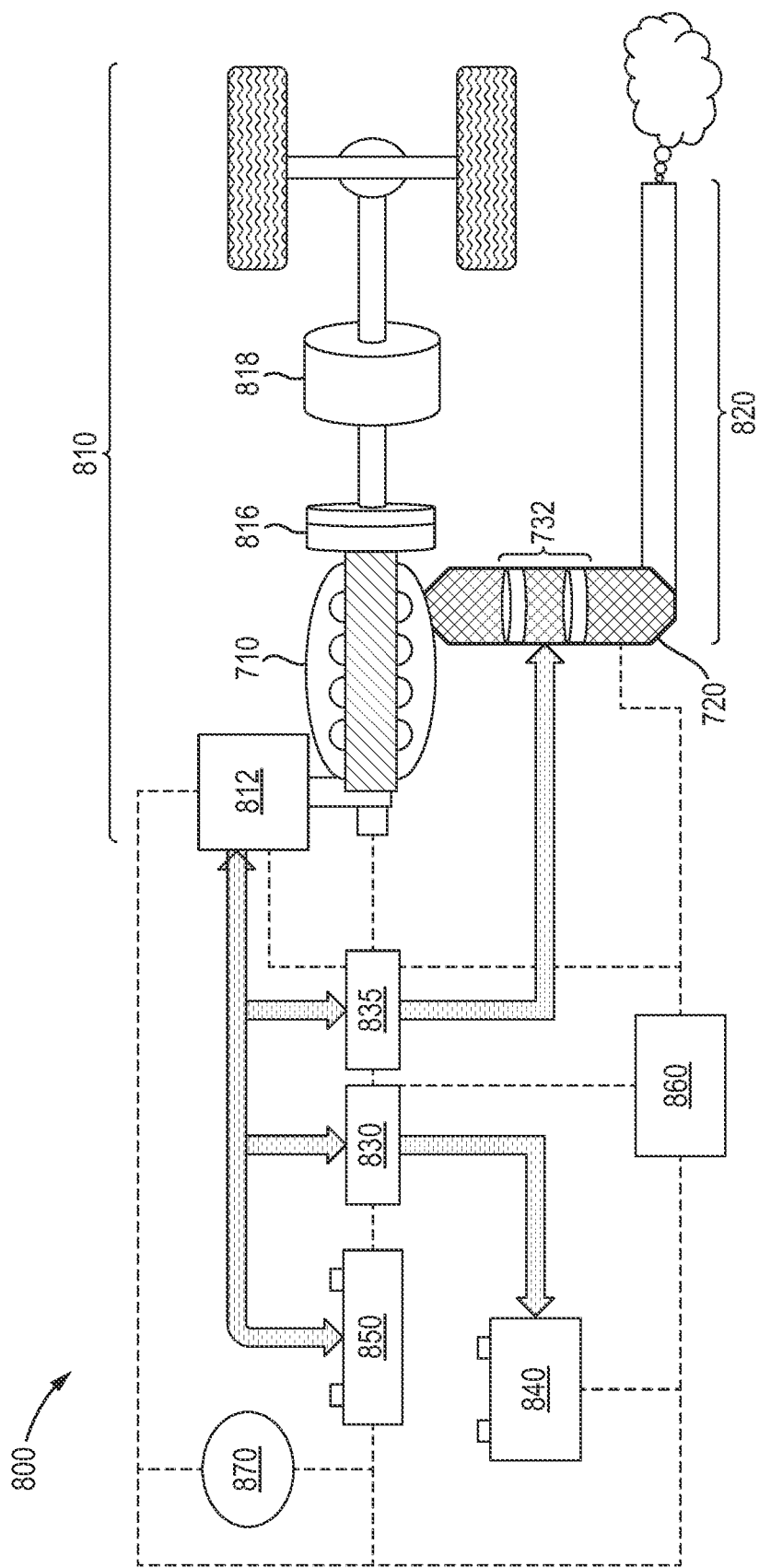
FIG. 8 illustrates a block diagram representing an electrical power control system for a hybrid vehicle, in accordance with at least one of the examples described herein.

FIG. 8 shows a block diagram representing an electrical power control system 800 for a hybrid vehicle. In the example shown in FIG. 8, the power control system 800 is for an exemplary mHEV system architecture, in accordance with at least one of the examples described herein. Shown in FIG. 8 is a belt-integrated starter-generator (BISG) 812, which is a device that may apply positive torque and assist the engine in reducing the amount of work it has to do, or, in some examples, apply negative torque to generate electrical energy. The BISG 812 may be referred to as a motor-generator. The BISG 812 is integrated into the drive train 810, along with engine 710, clutch 816, and transmission 818. In some examples, the BISG 812 replaces a conventional non-hybrid engine's low voltage (e.g., 12V) alternator. In some examples, the BISG 812 transmits torque to the engine's crankshaft when it's operating as a hybrid drive motor, and the crankshaft transmits torque back to the BISG 812 when it operates as a generator, converting kinetic energy from the moving vehicle back into electricity, operating as a conventional alternator.

In some examples, engine 710 has an exhaust system 820 comprising an eCAT 720. In the example shown in FIG. 8, a DC-DC converter 830 is electrically connected to a low voltage (e.g., 12V) battery and bus 840, which is configured to supply electrical power to one or more low voltage accessories of the HEV. In some examples, the eCAT is electrically connected to a power source via a plurality of PWM switches.

In the example shown in FIG. 8, the power control system 800 comprises a controller 860, e.g., an engine control module (ECM), in operational communication with each of the BISG 812, the engine 710, one or more the DC-DC converters 830, 835, the eCAT 720, a plurality of heating elements 732, the low voltage battery and bus 840, the high voltage battery and bus 850 (e.g., an HEV power system), and a pump 870. The pump 870 may be a compressor used to pump fluids such as water through the high voltage battery and bus 850, the one or more DC-DC converters 830, 835, and the BISG 812. In some examples, the power control system 800 further comprises an air pump (not shown) used to transfer the thermal energy from the eCAT to the after-treatment system, during, for example, low flow conditions. In such a case, the air pump would be fluidly connected to the engine exhaust system to draw air from the atmosphere through the eCAT 720 to transfer thermal energy from the heating elements 732 in the eCAT 720 to the catalyst brick.

The present disclosure is not limited to the set-up shown in FIG. 8. For example, the controller 860 may be a stand-alone controller or any other appropriate controller of the hybrid vehicle. For example, the controller may, at least in part, be integrated with another controller of the vehicle. Furthermore, the controller 860 may be configured to operationally communicate with any one or more of the vehicle components shown in FIG. 8, and/or any other appropriate components of the vehicle. For example, controller 860 may be a stand-alone controller configured to operationally communicate with at least one high voltage accessory, an electric motor-generator, and an eCAT, to control the electrical power output of the high voltage battery 850.

While the example shown in FIG. 8 exemplifies the use of the control system 800 for an mHEV, it is understood that the control system 800 may be implemented on an appropriate type of hybrid vehicle, such as a plug-in hybrid electric vehicle (PHEV), having one or more high voltage circuit components and an eCAT 720. System 800, shown in FIG. 8, is configured to supply the electrical power output of a high voltage battery 850 of a hybrid vehicle to the eCAT 720 and provide a regeneration sequence in response to an operational parameter of the eCAT 720 reaching a threshold, as described in the examples above and below.

In some examples, the configuration may not include a hybrid battery at all. For example, when the eCAT load is not dependent on the battery when the eCAT control is regulated by the DCDC, i.e., for a 48V based power supply system that is not an HV system (e.g., PHEV or HEV) the battery may not be required with the DCDC eCAT control.

Figure 9:
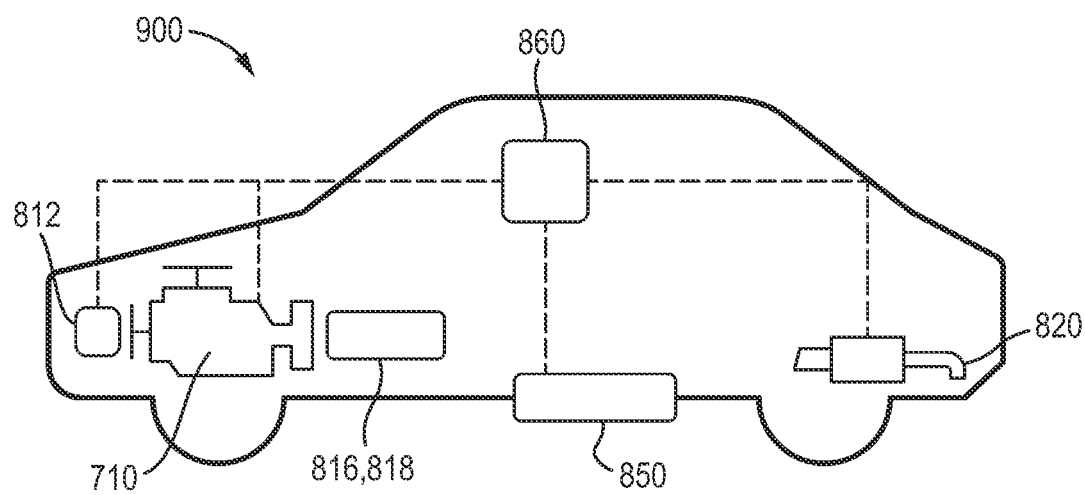
FIG. 9 illustrates a block diagram of a vehicle comprising an exemplary exhaust system, in accordance with at least one of the examples described herein.

FIG. 9 illustrates a vehicle 900 comprising an engine 710, an exemplary exhaust system 820, a control module 860, and a battery 850, in accordance with at least one of the examples described herein. According to some examples, there is provided with vehicle 900 comprising an exhaust after-treatment system 820 as described with reference to FIG. 8. In some examples, the vehicle 900 further comprises a drive train comprising a BISG 812, an engine 710, clutch 816 and transmission 818. The exhaust system 820 may comprise an eCAT as described in any of the examples above.

The methods described above may be implemented on vehicle 900. In some examples, the regeneration sequence of the after-treatment system is based on at least one of: a resistance; a temperature; a power draw; or a current draw, known as operational parameters. In response to a first operational parameter being outside a first threshold range and a second operational parameter being within a second threshold range, in some examples, a Powertrain Control Module (PCM) 860 commands that the system initiates a regeneration sequence of the after-treatment system configured to regenerate at least the first component of the after-treatment system.

Each of the systems in the vehicle are communicatively coupled via controller 860 (illustrated by the dashed line connectors). However, the present disclosure is not limited to the set-up shown in FIG. 9. For example, the controller 860 may be any appropriate type of controller, such as a stand-alone controller, or any other appropriate controller of the hybrid vehicle. For example, the controller 860 may, at least in part, be integrated with another controller of the vehicle. Furthermore, the controller 860 may be configured to operationally communicate with any one or more of the vehicle components shown in FIGS. 7-9, and/or any other appropriate components of the vehicle. For example, controller 860 may be a stand-alone controller at least partially configured to operationally communicate with at least one low voltage accessory, an electric generator, and an eCAT, to control torque demand on the engine 710. Furthermore, it is understood that controller 860 may be configured to carry out one or more of the above-disclosed electrical power control methods for a hybrid vehicle, as described above.

As shown and described with reference to FIGS. 1-9 above, the proposed solution and modelling methods use a configurable emissivity value in the heat equation of the model to provide a more accurate determination of the eCAT temperature, catalyst brick temperature, and pipe temperature. A more accurate determination of the aftertreatment components enables novel control methods of the eCAT, reducing the number of unnecessary activation events of the eCAT, which could in turn age or degrade the performance of the eCAT device over time. Therefore, this strategy can prevent exposing the eCAT device to extreme high-power output 'events' over its life, which could risk the device durability and therefore emissions robustness over 15 years. The eCAT is a dynamically controlled load, with low inductance and therefore it has a quick response. The DCDC control of the eCAT results in numerous advantages and is part of the system for various reasons, but in this instance can be utilized to modulate the input voltage to the eCAT device as the resistance increases to maintain the eCAT output power. In addition, there is no additional impact to cost or package in deploying this strategy because this strategy utilizes the existing components of the system (i.e., an additional DCDC is not needed to be added to the vehicle platform to enable the disclosed eCAT and model). Another key advantage is that the solution benefits from components that are already part of the system to yield improvements in emissions robustness and durability robustness over the life of the vehicle, which will be crucial at EU7 emission legislation.

FIG. 10 illustrates a block diagram 1000 of computing module 1002, in accordance with some embodiments of the disclosure. In some examples, computing module 1002 may be communicatively connected to a user interface. In some examples, computing module 1002, may be the controller 860 of the vehicle 900 as described with FIG. 9. In some examples, computing module 1002 may include processing circuitry, control circuitry, and storage (e.g., RAM, ROM, hard disk, a removable disk, etc.). Computing module 1002 may include an input/output, I/O, path 1006. I/O path 1020 may provide device information, or other data, over a local area network (LAN) or wide area network (WAN), and/or other content and data to control circuitry 1010, which includes processing circuitry 1014 and storage 1012. Control circuitry 1010 may be used to send and receive commands, requests, signals (digital and analog), and other suitable data using I/O path 1020. I/O path 1020 may connect control circuitry 1010 (and specifically processing circuitry 1014) to one or more communications paths. In some examples, computing module 1002 may be an on-board computer of a vehicle, such as vehicle 900.

Control circuitry 1010 may be based on any suitable processing circuitry such as processing circuitry 1014. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 914 executes instructions for computing module 902 stored in memory (e.g., storage 1012).

The memory may be an electronic storage device provided as storage 1012, which is part of control circuitry 1010. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Non-volatile memory may also be used (e.g., to launch a boot-up routine and other instructions). Storage 1012 may be sub-divided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 1010 has permission to operate on data in kernel space, while applications running in user mode must request control circuitry 1010 to perform tasks in kernel mode on its behalf.

Computing module 1002 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Computing module 1002 may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1010 is configured to carry out any of the methods as described herein. For example, storage 1012 may be a non-transitory computer-readable medium having instructions encoded thereon, to be carried out by processing circuitry 1014, which cause control circuitry 1010 to carry out a method for regenerating an after-treatment system of a vehicle. For example, the control circuitry may carry out a method that comprises the steps of measuring a power demand from a first component of the aftertreatment system; calculating a heat transfer into the first component of the aftertreatment system based on power demand of the first component and a configurable emissivity value of the exhaust gas, and calculating the temperature of the first component based on the calculated heat transfer.

It should be understood that the examples described above are not mutually exclusive with any of the other examples described with reference to FIGS. 1-10. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and is intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method for model-based determination of heat transfer in an exhaust aftertreatment system of a vehicle, the method comprising:
measuring a power demand from a first component of the aftertreatment system;
calculating a heat transfer into the first component of the aftertreatment system based on power demand of the first component and a configurable emissivity value of the exhaust gas, wherein the emissivity value of the exhaust gas is configured in response to determining that an internal combustion engine, ICE, of the vehicle is on and a secondary airflow is on;
determining if the ICE of the vehicle is on and a secondary airflow is off; and
in response to determining that the ICE is on and secondary airflow is off, configuring the emissivity value of the exhaust gas based on an air-fuel ratio, corrected for a pressure and a temperature of the aftertreatment system.

2. The method of claim 1, further comprising:
estimating a volumetric flow rate of exhaust gas through the aftertreatment system; and
wherein the calculation of the heat transfer into a first component of the aftertreatment system is based on the volumetric flow rate of the exhaust gas.

3. The method of claim 1, further comprising configuring the emissivity value of the exhaust gas based on at least one of:
air-mass ratio;
fuel type; or
emissions output.

4. The method of claim 3, further comprising:
determining if an internal combustion engine, ICE, of the vehicle is on and a secondary airflow is on; and
wherein the emissivity value of the exhaust gas is further configured based on air-mass ratio, air-fuel ratio, corrected for pressure and temperature of the aftertreatment system.

5. The method of claim 1, further comprising:
wherein the first component of the aftertreatment system is an electrically heated catalyst, eCAT;
determining if the eCAT is on or off; and
in response to determining the eCAT is on, selecting a first radiation heat transfer equation.

6. The method of claim 5, further comprising:
in response to determining the eCAT is off, selecting a convection heat transfer equation, a second radiation heat transfer equation, or a combination of the convection heat transfer equation and second radiation heat transfer equations.

7. The method of claim 1, further comprising:
monitoring an ambient temperature of the vehicle; and
wherein the calculation of the heat transfer is further based on the ambient temperature of the vehicle.

8. The method of claim 1, further comprising:
wherein the aftertreatment system is divided into segments in an axial direction and the first component is located in a first segment;
calculating the temperature of a second segment, disposed upstream of the first segment, wherein the calculation of the heat transfer is further based on an input heat from the second segment; and
calculating the temperature of a third segment, disposed downstream of the first segment, wherein the calculation of the heat transfer is further based on an output heat to the third segment.

9. A vehicle comprising the after treatment system of claim 1.

10. A non-transitory computer-readable medium having instructions encoded thereon for model-based determination of heat transfer in an exhaust aftertreatment system of a vehicle which, when executed, carry out the method of claim 1.

11. An after-treatment system of a vehicle comprising:
an electrically heated catalyst, eCAT, electrically coupled to a power source; and
a controller, communicatively coupled to the eCAT and the power source, the controller configured to:
measure a power demand of the eCAT from the power source;
monitor an ambient temperature of the vehicle;
calculate a heat transfer into the eCAT of the aftertreatment system based on the power demand of the eCAT, the ambient temperature of the vehicle, and a configurable emissivity value of the exhaust gas, wherein the emissivity value of the exhaust gas is configured in response to determining that an internal combustion engine, ICE, of the vehicle is on and a secondary airflow is on;
determine if the ICE of the vehicle is on and a secondary airflow is off; and
in response to determining that the ICE is on and secondary airflow is off, configure the emissivity value of the exhaust gas based on an air-fuel ratio, corrected for a pressure and a temperature of the aftertreatment system.

12. The aftertreatment system of claim 11, the controller further configured to:
estimate a volumetric flow rate of exhaust gas through the aftertreatment system; and
wherein the calculation of the heat transfer into the eCAT of the aftertreatment system is based on the volumetric flow rate of the exhaust gas.

13. The aftertreatment system of claim 11, wherein the controller is adapted to configure the emissivity value of the exhaust gas based on at least one of:
air-mass ratio;
fuel type; or
emissions output.

14. The aftertreatment system of claim 13, the controller further configured to:
determining if an internal combustion engine, ICE, of the vehicle is on and a secondary airflow is on; and
wherein the emissivity value of the exhaust gas is further configured based on air-mass ratio, air-fuel ratio, corrected for pressure and temperature of the aftertreatment system.

15. The aftertreatment system of claim 11, the controller further configured to:
determine if the eCAT is on or off; and
in response to determining the eCAT is on, select a first radiation heat transfer equation.

16. The aftertreatment system of claim 15, the controller further configured to:
in response to determining the eCAT is off, select a convection heat transfer equation, a second radiation heat transfer equation, or a combination of the convection heat transfer equation and second radiation heat transfer equations.

17. A method for model-based determination of heat transfer of an exhaust aftertreatment system of a vehicle, the method comprising:
measuring a power demand from a first component of the aftertreatment system; and
calculating a heat transfer into the first component of the aftertreatment system based on power demand of the first component and a configurable emissivity value of the exhaust gas, wherein the emissivity value of the exhaust gas is configured in response to determining that an internal combustion engine, ICE, of the vehicle is on and a secondary airflow is off.

18. The method of claim 17, further comprising:
estimating a volumetric flow rate of exhaust gas through the aftertreatment system;
wherein the calculation of the heat transfer into a first component of the aftertreatment system is based on the volumetric flow rate of the exhaust gas;
determining if an internal combustion engine, ICE, of the vehicle is on and a secondary airflow is off; and
wherein the emissivity value of the exhaust gas is configured based on air-fuel ratio, corrected for pressure and temperature of the aftertreatment system.

* * * * *